United States Patent
Khan et al.

(10) Patent No.: US 8,243,774 B2
(45) Date of Patent: Aug. 14, 2012

(54) SYSTEM AND METHOD FOR INFORMATION SCRAMBLING IN A WIRELESS COMMUNICATION SYSTEM

(75) Inventors: Farooq Khan, Allen, TX (US); Jiann-An Tsai, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1350 days.

(21) Appl. No.: 11/865,026

(22) Filed: Sep. 30, 2007

(65) Prior Publication Data
US 2008/0159537 A1 Jul. 3, 2008

Related U.S. Application Data

(60) Provisional application No. 60/878,292, filed on Jan. 3, 2007.

(51) Int. Cl.
*H04B 1/00* (2006.01)

(52) U.S. Cl. ......... 375/141; 375/146; 375/261; 375/298

(58) Field of Classification Search .................. 375/140, 375/141, 146, 261, 285, 295, 296, 298
See application file for complete search history.

(56) References Cited

U.S. PATENT DOCUMENTS

| | | | |
|---|---|---|---|
| 5,668,879 A * | 9/1997 | Ibaraki et al. ................. 380/41 |
| 6,505,299 B1 * | 1/2003 | Zeng et al. ..................... 713/160 |
| 6,535,500 B1 * | 3/2003 | Su ................. 370/342 |
| 6,983,029 B2 * | 1/2006 | Alavi et al. ................... 375/329 |
| 7,292,627 B2 * | 11/2007 | Tzannes ........................ 375/222 |
| 2005/0141410 A1 * | 6/2005 | Zhang et al. .................. 370/206 |

* cited by examiner

*Primary Examiner* — Dac Ha

(57) ABSTRACT

The present disclosure relates generally to a system and method for scrambling in a wireless communication system. In one example, the method includes receiving a bit group representing at least a portion of a signal, where a total number of bits in the bit group is defined by a modulation scheme applied to the signal. A bit of the bit group is identified that indicates a sign of an imaginary part of the signal and another bit of the bit group is identified that indicates a sign of a real part of the signal. Only the two bits indicating the signs of the imaginary and real parts of the signal are scrambled using a random sequence prior to wirelessly transmitting the bit group.

20 Claims, 8 Drawing Sheets

```
800
  │
  ▼
┌─────────────────────────────────────┐
│ RECEIVE A BIT GROUP REPRESENTING    │ ── 802
│ AT LEAST A PORTION OF THE SIGNAL    │
└─────────────────────────────────────┘
              │
              ▼
┌─────────────────────────────────────┐
│ IDENTIFY A FIRST BIT OF THE BIT     │ ── 804
│ GROUP THAT INDICATES A SIGN OF AN   │
│ IMAGINARY PART OF THE SIGNAL        │
└─────────────────────────────────────┘
              │
              ▼
┌─────────────────────────────────────┐
│ IDENTIFY A SECOND BIT OF THE BIT    │ ── 806
│ GROUP THAT INDICATES A SIGN OF A    │
│ REAL PART OF THE SIGNAL             │
└─────────────────────────────────────┘
              │
              ▼
┌─────────────────────────────────────┐
│ SCRAMBLE ONLY THE FIRST AND SECOND  │ ── 808
│ BITS OF THE BIT GROUP USING A       │
│ RANDOM SEQUENCE PRIOR TO WIRELESSLY │
│ TRANSMITTING THE BIT GROUP          │
└─────────────────────────────────────┘
```

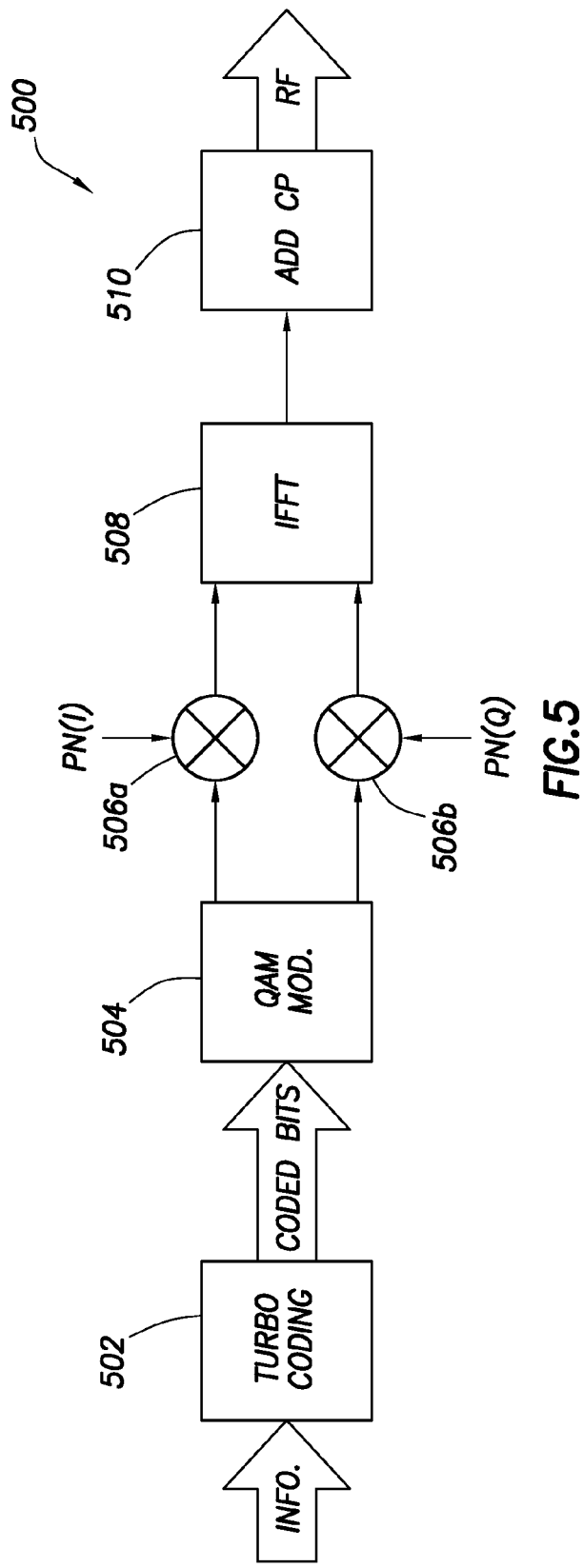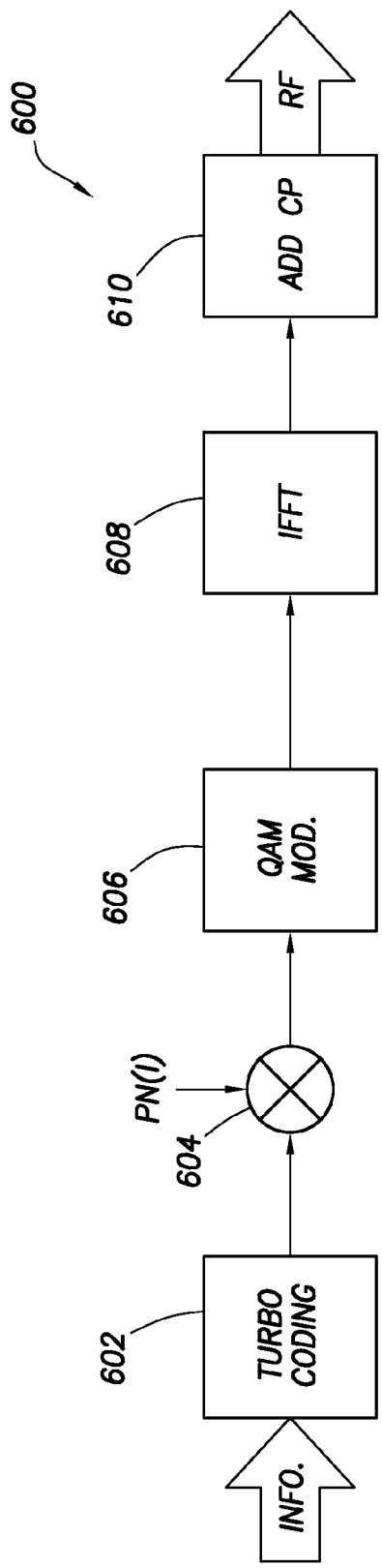

SYSTEM AND METHOD FOR INFORMATION SCRAMBLING IN A WIRELESS COMMUNICATION SYSTEM

CLAIM OF PRIORITY

This application claims priority from U.S. Provisional Patent Application Ser. No. 60/878,292, filed on Jan. 3, 2007, and entitled "INFORMATION SCRAMBLING IN A WIRELESS COMMUNICATION SYSTEM", which is hereby incorporated by reference in its entirety.

BACKGROUND

Wireless communication systems generally perform scrambling before transmitting a signal. Such scrambling may be used for a variety of purposes, such as randomizing a data stream to eliminate long sequences containing only 0's or 1's and assuring energy dispersal (i.e., to eliminate the dependence of a signal's power spectrum upon the actual transmitted data). However, improved scrambling methods and systems are needed to address existing issues in current scrambling processes.

SUMMARY

In one embodiment, a method comprises receiving a bit group representing at least a portion of a signal, wherein a total number of bits in the bit group is defined by a modulation scheme applied to the signal. A first bit of the bit group is identified that indicates a sign of an imaginary part of the signal and a second bit of the bit group is identified that indicates a sign of a real part of the signal. Only the first and second bits of the bit group are scrambled using a random sequence prior to wirelessly transmitting the bit group.

In another embodiment, a method comprises wirelessly receiving a bit group representing at least a portion of a signal. A first bit of the bit group is identified that indicates a sign of an imaginary part of the signal and a second bit of the bit group is identified that indicates a sign of a real part of the signal. Only the first and second bits of the bit group are descrambled using a random sequence that corresponds to a random sequence used to scramble only the first and second bits of the bit group prior to transmission.

In yet another embodiment, a transmission system comprises a modulation block configured to modulate a signal for transmission, a random sequence coding block coupled to the modulation block and configured to scramble only bits of the signal indicating a sign of an imaginary part and a real part of the signal without scrambling the remaining bits of the signal, and transmission circuitry configured to transmit the modulated and scrambled signal via an antenna.

In still another embodiment, a receiving system comprises receiving circuitry configured to receive a modulated and scrambled signal via an antenna, a demodulation block configured to demodulate the signal, and a random sequence decoding block coupled to the demodulation block and configured to descramble only bits of the signal indicating a sign of an imaginary part and a real part of the signal without descrambling the remaining bits of the signal.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 illustrates a transmission system that separately scrambles the I-part and Q-part of a signal after modulation.

FIG. 6 illustrates a transmission system using a single pseudonoise code for scrambling a signal prior to modulation.

DETAILED DESCRIPTION

Figure 1A:
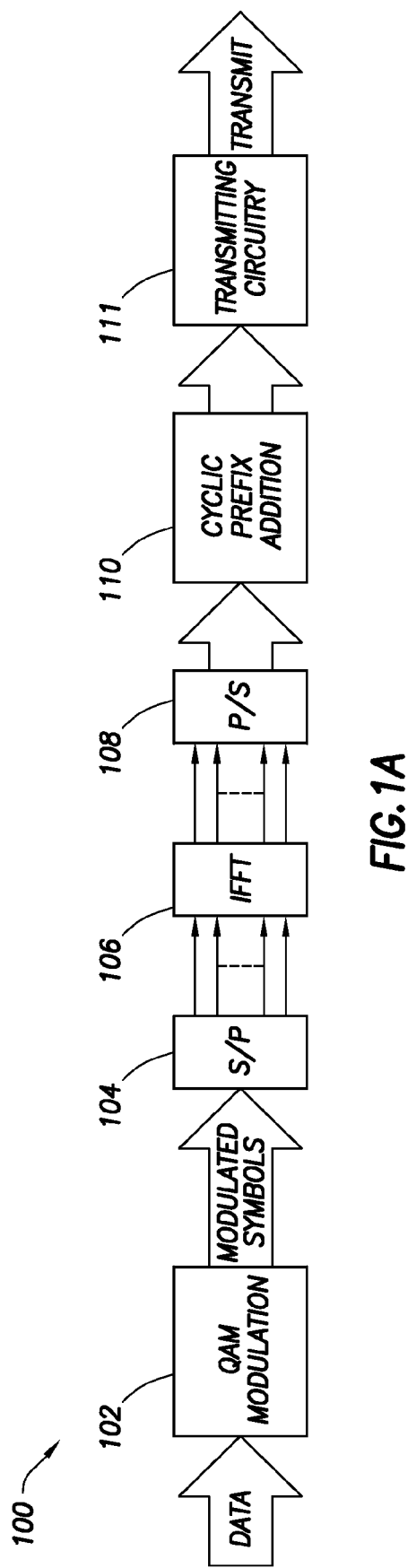
FIG. 1A is a block diagram of one embodiment of a wireless transmitter with which various aspects of the present invention may be used.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1B:
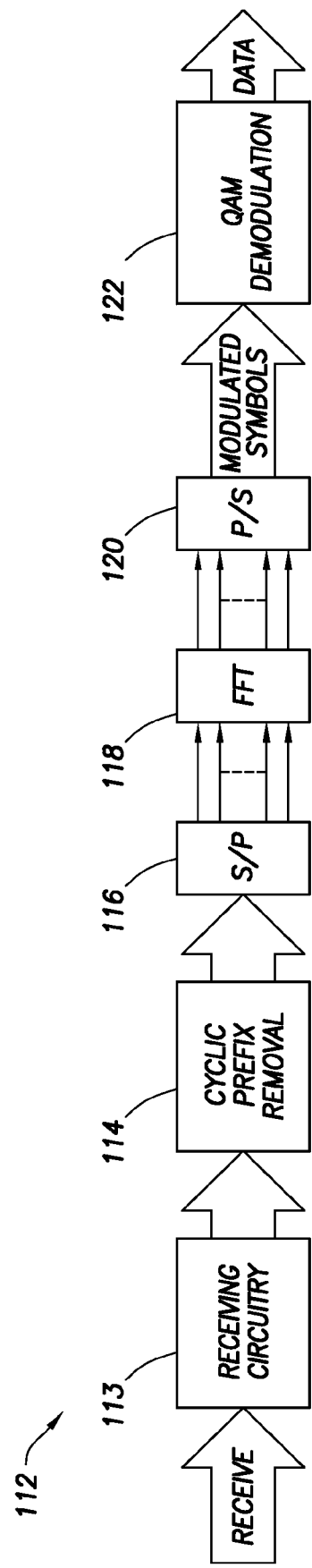
FIG. 1B is a block diagram of one embodiment of a wireless receiver with which various aspects of the present invention may be used.

Referring to FIGS. 1A and 1B, one embodiment of an OFDM based wireless communication system is provided. FIG. 1A illustrates a transmitter 100 for the OFDM based wireless communication system, while FIG. 1B illustrates a receiver 112 for the system. The transmitter 100 may be an access point (e.g., a base station) in a wireless network such as the wireless network 100 of FIG. 1, and such networks may include wideband digital communication systems such as wireless local area networks (LANs) (e.g., IEEE 802.11a and 802.11g networks), digital audio broadcasting systems (e.g., HD Radio, T-DMB and ISDB-TSB), terrestrial digital television systems (e.g., DVB-T, DVB-H, T-DMB and ISDB-T), WiMax wireless metropolitan area networks (MANs) (e.g., IEEE 802.16 networks), Mobile Broadband Wireless Access (MBWA) networks (e.g., IEEE 802.20 networks), Ultra Mobile Broadband (UMB) systems, Flash-OFDM cellular systems, and Ultra wideband (UWB) systems. It is understood that OFDM is used as an example and that the present disclosure may be used with other wireless systems. For example, the present disclosure may be used with Global System for Mobile communications (GSM) and/or code division multiple access (CDMA) communications systems.

The transmitter 100 and/or receiver 112 may be any wireless OFDM device and may be included in such fixed or mobile terminals as computers, cell phones, personal digital assistants (PDAs), pagers, portable game devices, and any other device capable of wireless communications. Furthermore, the transmitter 100 and receiver 112 may be combined into a single device, such as a mobile handset device to provide a portable platform with both transmitting and receiving functionality. Although not shown, it is understood that the transmitter 100 and/or receiver 112 may include memory, processing capabilities (e.g., a central processing unit) coupled to the memory, and instructions stored in the memory to perform various functions.

With specific reference to the transmitter 100 of FIG. 1A, data to be transmitted is converted into modulated symbols via a Quadrature Amplitude Modulation (QAM) process in QAM modulation block 102. The modulated symbols are serial-to-parallel (S/P) converted in S/P block 104 and input to an inverse Fast Fourier Transform (IFFT) block 106. The IFFT block 106 outputs N time-domain samples, where N refers to the IFFT/FFT size used by the OFDM system. After processing by the IFFT block 106, the signal is parallel-to-serial (P/S) converted by P/S block 108 and a cyclic prefix (CP) is added to the signal sequence by CP addition block 110. The resulting sequence of samples is referred to as an OFDM symbol and may be transmitted after up-conversion to RF via transmitting circuitry 111 (which may provide up-conversion, amplification, and/or other functionality).

With specific reference to the receiver 112 of FIG. 1B, an OFDM symbol is received via receiving circuitry 113, which may handle such functions as down-conversion from RF. After down-conversion from RF, the cyclic prefix is first removed from a received OFDM symbol by CP removal block 114 and the signal is serial-to-parallel converted by S/P block 116. The signal is then fed into FFT block 118, and the output of the FFT block 118 is parallel-to-serial converted in P/S block 120. The resulting QAM modulation symbols are input to QAM demodulation block 122, which demodulates the symbols to recover the transmitted data.

The total bandwidth in an OFDM system, such as that of FIGS. 1A and 1B, is divided into narrowband frequency units called subcarriers. The number of subcarriers is equal to the FFT/IFFT size N used in the system. Generally, the number of subcarriers used for data is less than N because some subcarriers at the edge of the frequency spectrum are reserved as guard subcarriers, and usually no information is transmitted on guard subcarriers.

Figure 2:
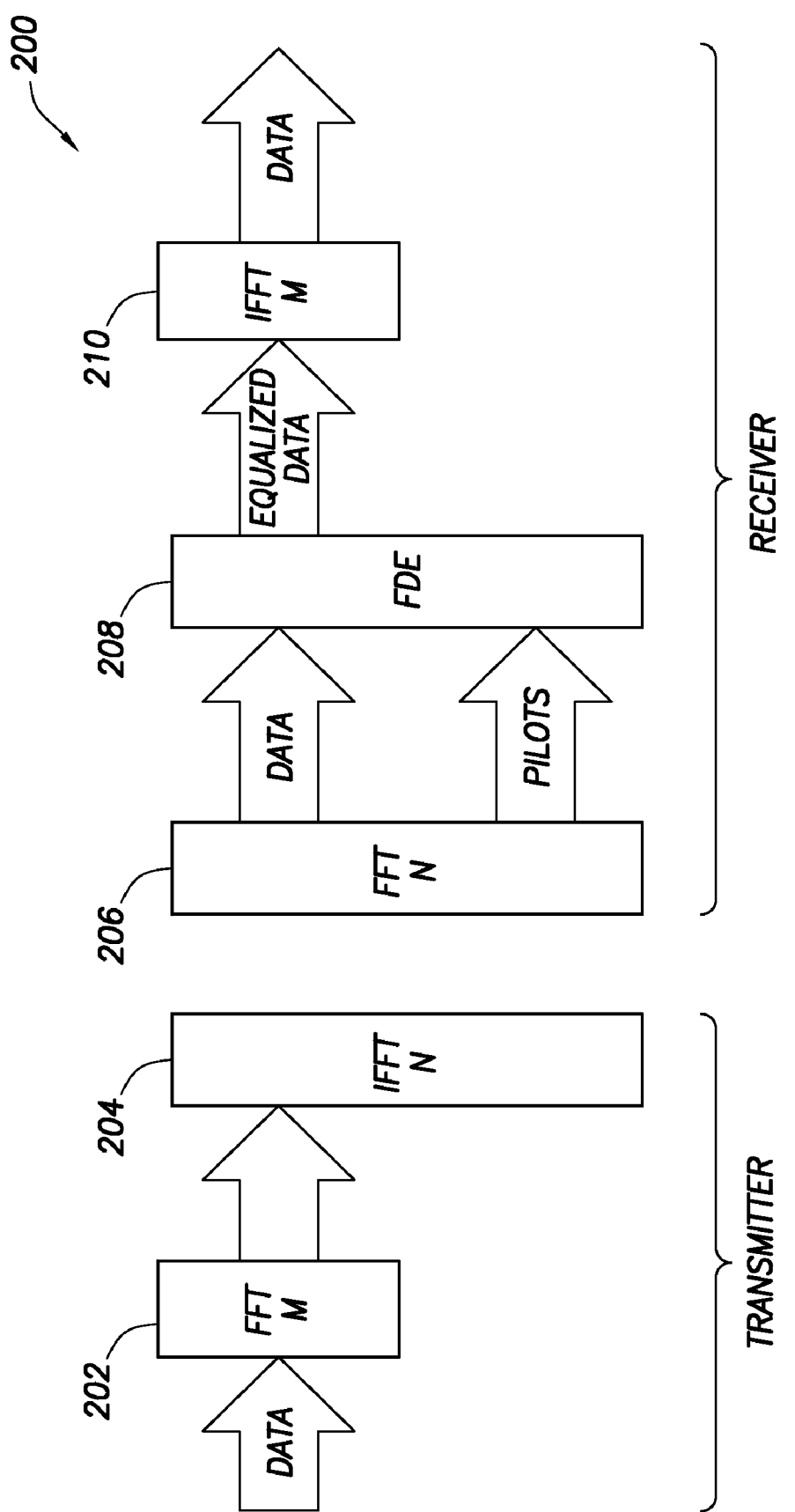
FIG. 2 is a block diagram of another embodiment of a wireless system with which the present invention may be used.

With additional reference to FIG. 2, one embodiment of a discrete Fourier transform spread (DFT-spread) OFDM system 200 is illustrated. Generally, an advanced wireless system may employ OFDMA or DFT-spread OFDMA. A DFT-spread OFDM system may be attractive for use in the uplink (i.e., the link from a mobile station to a base station) in a wireless system due to its low peak-to-average power (PAPR) characteristic. This low PAPR is due to the relatively limited transmit power available in a mobile station. A low PAPR enables a lower power amplifier back off and allows a mobile station to transmit at a higher power and higher data rate, thereby improving the coverage and spectral efficiency of a wireless system.

Within the DFT-spread OFDM system 200, coded modulation symbols are FFT-pre-coded in FFT block 202 before mapping to the input of IFFT block 204 in a transmitter. At a receiver, FFT block 206 handles the received signal, which is then passed to frequency-domain equalization (FDE) block 208, where FDE is performed. An IFFT operation is then performed in IFFT block 210 on the equalized symbols to obtain the data modulation symbols.

Figure 3:
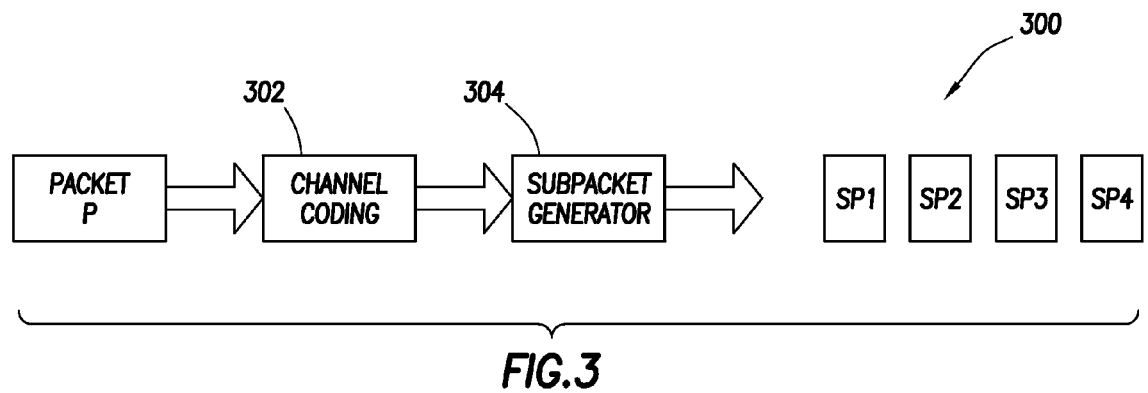
FIG. 3 is a block diagram illustrating the generation of hybrid automatic repeat requests (hybrid ARQ) in one embodiment of a transmission system.

Referring to FIG. 3, a block diagram 300 that illustrates one embodiment of a hybrid automatic repeat request (ARQ) scheme. Hybrid ARQ is a retransmission scheme whereby a transmitter (e.g., the transmitter 100 of FIG. 1A) sends redundant coded information in small increments. In the present example, the transmitter generates multiple subpackets SP1-SP4 by first performing channel coding using a channel coding process 302 on an information packet P and then breaking the resulting coded bit stream into smaller units called subpackets via a subpacket generator process 304. The hybrid ARQ retransmissions can either contain redundant symbols or coded bits that are different than the previous transmission (s) or copies of the same symbols or coded bits. The hybrid ARQ scheme that retransmits copies of the same information is generally referred to as a chase combining scheme, while the hybrid ARQ scheme that uses retransmitted symbols or coded bits that are different than the previous transmission is generally referred to as an incremental redundancy scheme. In the chase combining scheme, the subpackets SP1, SP2, SP3 and SP4 are identical.

Figure 4:
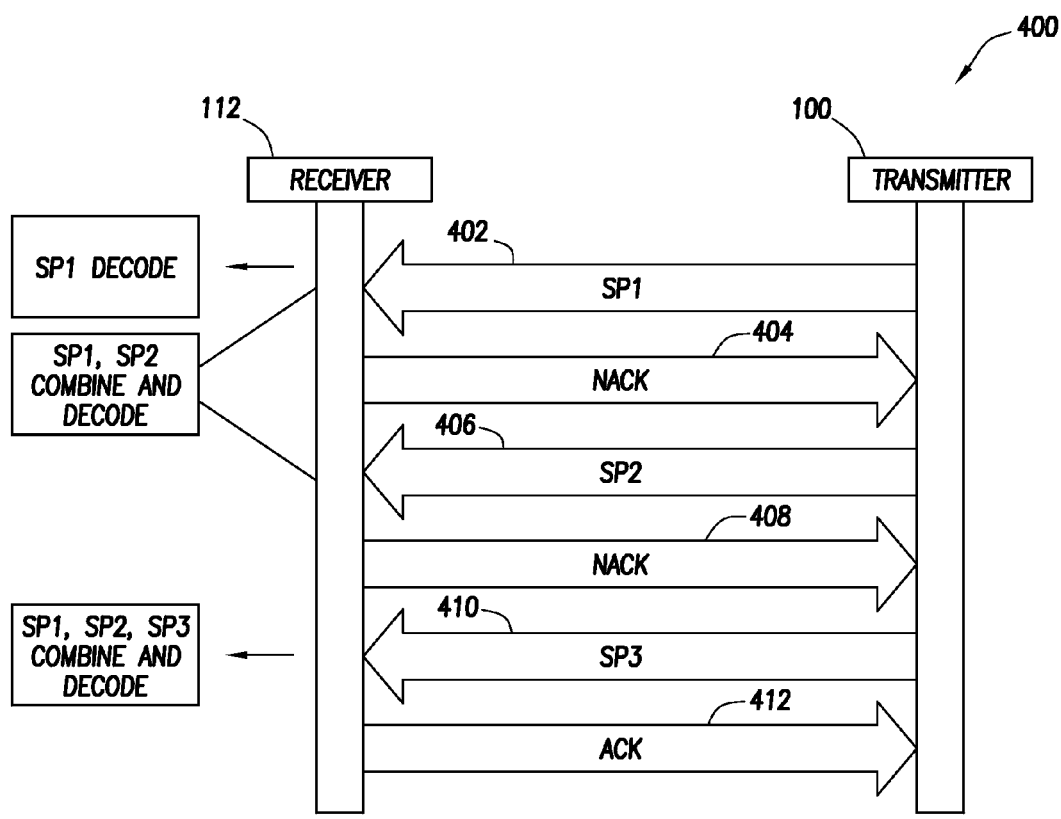
FIG. 4 is an embodiment of a sequence diagram illustrating a hybrid ARQ message flow between a receiver and a transmitter.

With additional reference to FIG. 4, a sequence diagram 400 illustrates an example of a hybrid ARQ protocol. In step 402, a receiver (e.g., the receiver 112 of FIG. 1B) receives the first subpacket SP1 from a transmitter (e.g., the transmitter 100 of FIG. 1A) and attempts to decode the information contained in the packet. If the attempt is unsuccessful, the receiver 112 stores the subpacket SP1 and sends a negative acknowledgment (NACK) signal to the transmitter in step 404. After receiving the NACK signal, the transmitter 100 transmits the second subpacket SP2 in step 406. After receiving the second subpacket SP2, the receiver 112 combines SP2 with the previously stored subpacket SP1 and attempts to jointly decode the information packet P using the combined subpackets.

At any point in the process, if the information packet is successfully decoded (e.g., as indicated by a successful CRC (Cyclic Redundancy Check)), the receiver 112 sends an acknowledgement (ACK) signal to the transmitter 100 as shown in step 412. In current example, the information packet P is successfully decoded after receiving and combining three subpackets, SP1, SP2 and SP3. Accordingly, after step 406, the receiver 112 sends another NACK signal in step 408, and the transmitter 100 transmits the subpacket SP3 to the receiver in step 410. The ARQ protocol illustrated in FIG. 4 is generally referred to as a stop-and-wait protocol because the transmitter 100 waits for an ACK/NACK signal from the receiver 112 before sending the next subpacket. After receiving the ACK signal in step 412, the transmitter 100 may begin transmission of a new information packet to the same receiver 112 or a different receiver.

Referring to FIG. 5, a block diagram of a transmission system 500 is illustrated with scrambling functionality. As is known in the art, scrambling may be used to randomize a data stream to eliminate long sequences containing only 0's or 1's and to assure energy dispersal (i.e., to eliminate the dependence of a signal's power spectrum upon the actual transmitted data). The present example uses a pseudonoise code (PN code) that has a spectrum similar to a random sequence of bits but is deterministically generated. In the present disclosure, it is understood that the term "random" may not refer to truly random values, but may refer to deterministically determined values that give the appearance of randomness. Furthermore, the term "random sequence" as used herein may refer to a PN code or any other random sequence used for scrambling purposes.

In the present example, information in the transmission system 500 enters a turbo coding block 502, which produces coded bits that are passed to a QAM modulation block 504. After modulation, PN coding is performed in PN(I) block 506a and PN(Q) block 506b. In the present example, the real (I) and imaginary (Q) parts of a complex modulation symbol I+jQ are scrambled by two PN codes with the I-part scrambled by a PN(I) code in PN(I) block 506a and the Q-part scrambled by a PN(Q) code in PN(Q) block 506b. The PN(I) and PN(Q) codes can be the same code (i.e., PN(I)=PN(Q)) or they may be two different PN codes. An issue faced by this system is that the I and Q parts need to be separately scrambled.

After scrambling, the PN coded signals are passed to an IFFT block 508, which outputs time-domain samples. After processing by the IFFT block 508, a cyclic prefix is added to the signal sequence by CP addition block 510. The resulting sequence of samples may be transmitted after up-conversion to RF. It is understood that other components, such as an S/P block and a P/S block may be included in the transmission system 500 as previously described, but have been omitted for purposes of clarity.

Referring to FIG. 6, a block diagram of a transmission system 600 is illustrated with scrambling functionality. In the present example, information in the transmission system 600 enters a turbo coding block 602, which produces coded bits that are passed to a PN coding block 604. In this example, the coded sequence of bits is scrambled by a single PN code before modulation. One issue with this approach is degraded turbo decoding performance for 16-QAM and higher order modulations. For example, 16-QAM modulation has two amplitudes and a sign for each symbol and so bit level scrambling cannot be unscrambled at the receiver because it cannot be demodulated. Another issue with this approach is that the previously described modulation symbol-level chase combining Hybrid ARQ can not be performed because scrambling occurs before modulation.

After scrambling, the sequence of bits is passed to QAM modulation block 606 and then to an IFFT block 608, which outputs time-domain samples. After processing by the IFFT block 608, a cyclic prefix is added to the signal sequence by CP addition block 610. The resulting sequence of samples is referred to as OFDM symbol and may be transmitted after up-conversion to RF. It is understood that other components, such as an S/P block and a P/S block may be included in the system 600 as previously described, but have been omitted for purposes of clarity.

For purposes of example, the present disclosure uses certain modulation schemes that are commonly used in wireless systems, including Quadrature Phase Shift Keying (QPSK), 16-QAM and 64-QAM. However, it is understood that the present disclosure may be applied to any modulation scheme having the characteristics needed for the invention described herein to operate.

In the case of QPSK modulation, pairs of bits $b(n)$, $b(n+1)$ are mapped to complex-valued modulation symbols $x=I+jQ$, as illustrated below in Table 1.

TABLE 1

| $b(n), b(n+1)$ | I | Q |
| --- | --- | --- |
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

In the case of 16-QAM modulation, quadruplets of bits $b(n)$, $b(n+1)$, $b(n+2)$, $b(n+3)$ are mapped to complex-valued modulation symbols $x=I+jQ$, as illustrated below in Table 2.

TABLE 2

| $b(n), b(n+1),$ $b(n+2), b(n+3)$ | I | Q |
| --- | --- | --- |
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

In the case of 64-QAM modulation, hextuplets of bits $b(n)$, $b(n+1)$, $b(n+2)$, $b(n+3)$, $b(n+4)$, $b(n+5)$ are mapped to complex-valued modulation symbols $x=I+jQ$, as illustrated below in Table 3.

TABLE 3

| $b(n), b(n+1), b(n+2), b(n+3), b(n+4), b(n+5)$ | I | Q |
| --- | --- | --- |
| 000000 | $3/\sqrt{42}$ | $3/\sqrt{42}$ |
| 000001 | $3/\sqrt{42}$ | $1/\sqrt{42}$ |
| 000010 | $1/\sqrt{42}$ | $3/\sqrt{42}$ |
| 000011 | $1/\sqrt{42}$ | $1/\sqrt{42}$ |
| 000100 | $3/\sqrt{42}$ | $5/\sqrt{42}$ |
| 000101 | $3/\sqrt{42}$ | $7/\sqrt{42}$ |
| 000110 | $1/\sqrt{42}$ | $5/\sqrt{42}$ |
| 000111 | $1/\sqrt{42}$ | $7/\sqrt{42}$ |
| 001000 | $5/\sqrt{42}$ | $3/\sqrt{42}$ |
| 001001 | $5/\sqrt{42}$ | $1/\sqrt{42}$ |
| 001010 | $7/\sqrt{42}$ | $3/\sqrt{42}$ |
| 001011 | $7/\sqrt{42}$ | $1/\sqrt{42}$ |
| 001100 | $5/\sqrt{42}$ | $5/\sqrt{42}$ |
| 001101 | $5/\sqrt{42}$ | $7/\sqrt{42}$ |
| 001110 | $7/\sqrt{42}$ | $5/\sqrt{42}$ |
| 001111 | $7/\sqrt{42}$ | $7/\sqrt{42}$ |
| 010000 | $-3/\sqrt{42}$ | $-3/\sqrt{42}$ |
| 010001 | $-3/\sqrt{42}$ | $-1/\sqrt{42}$ |
| 010010 | $-1/\sqrt{42}$ | $-3/\sqrt{42}$ |
| 010011 | $-1/\sqrt{42}$ | $-1/\sqrt{42}$ |
| 010100 | $-3/\sqrt{42}$ | $-5/\sqrt{42}$ |
| 010101 | $-3/\sqrt{42}$ | $-7/\sqrt{42}$ |

TABLE 3-continued

| b(n), b(n + 1), b(n + 2), b(n + 3), b(n + 4), b(n + 5) | I | Q |
|---|---|---|
| 010110 | $-1/\sqrt{42}$ | $-5/\sqrt{42}$ |
| 010111 | $-1/\sqrt{42}$ | $-7/\sqrt{42}$ |
| 011000 | $-5/\sqrt{42}$ | $-3/\sqrt{42}$ |
| 011001 | $-5/\sqrt{42}$ | $-1/\sqrt{42}$ |
| 011010 | $-7/\sqrt{42}$ | $-3/\sqrt{42}$ |
| 011011 | $-7/\sqrt{42}$ | $-1/\sqrt{42}$ |
| 011100 | $-5/\sqrt{42}$ | $-5/\sqrt{42}$ |
| 011101 | $-5/\sqrt{42}$ | $-7/\sqrt{42}$ |
| 011110 | $-7/\sqrt{42}$ | $-5/\sqrt{42}$ |
| 011111 | $-7/\sqrt{42}$ | $-7/\sqrt{42}$ |
| 100000 | $-3/\sqrt{42}$ | $3/\sqrt{42}$ |
| 100001 | $-3/\sqrt{42}$ | $1/\sqrt{42}$ |
| 100010 | $-1/\sqrt{42}$ | $3/\sqrt{42}$ |
| 100011 | $-1/\sqrt{42}$ | $1/\sqrt{42}$ |
| 100100 | $-3/\sqrt{42}$ | $5/\sqrt{42}$ |
| 100101 | $-3/\sqrt{42}$ | $7/\sqrt{42}$ |
| 100110 | $-1/\sqrt{42}$ | $5/\sqrt{42}$ |
| 100111 | $-1/\sqrt{42}$ | $7/\sqrt{42}$ |
| 101000 | $-5/\sqrt{42}$ | $3/\sqrt{42}$ |
| 101001 | $-5/\sqrt{42}$ | $1/\sqrt{42}$ |
| 101010 | $-7/\sqrt{42}$ | $3/\sqrt{42}$ |
| 101011 | $-7/\sqrt{42}$ | $1/\sqrt{42}$ |
| 101100 | $-5/\sqrt{42}$ | $5/\sqrt{42}$ |
| 101101 | $-5/\sqrt{42}$ | $7/\sqrt{42}$ |
| 101110 | $-7/\sqrt{42}$ | $5/\sqrt{42}$ |
| 101111 | $-7/\sqrt{42}$ | $7/\sqrt{42}$ |
| 110000 | $3/\sqrt{42}$ | $-3/\sqrt{42}$ |
| 110001 | $3/\sqrt{42}$ | $-1/\sqrt{42}$ |
| 110010 | $1/\sqrt{42}$ | $-3/\sqrt{42}$ |
| 110011 | $1/\sqrt{42}$ | $-1/\sqrt{42}$ |
| 110100 | $3/\sqrt{42}$ | $-5/\sqrt{42}$ |
| 110101 | $3/\sqrt{42}$ | $-7/\sqrt{42}$ |
| 110110 | $1/\sqrt{42}$ | $-5/\sqrt{42}$ |
| 110111 | $1/\sqrt{42}$ | $-7/\sqrt{42}$ |
| 111000 | $5/\sqrt{42}$ | $-3/\sqrt{42}$ |
| 111001 | $5/\sqrt{42}$ | $-1/\sqrt{42}$ |
| 111010 | $7/\sqrt{42}$ | $-3/\sqrt{42}$ |
| 111011 | $7/\sqrt{42}$ | $-1/\sqrt{42}$ |
| 111100 | $5/\sqrt{42}$ | $-5/\sqrt{42}$ |
| 111101 | $5/\sqrt{42}$ | $-7/\sqrt{42}$ |
| 111110 | $7/\sqrt{42}$ | $-5/\sqrt{42}$ |
| 111111 | $7/\sqrt{42}$ | $-7/\sqrt{42}$ |

In the modulation constellations provided as examples in Tables 1-3, the first bit of a bit group represents the sign of the I component of the signal and the second bit of the bit group represents the sign of the Q component of the signal. For example, in Tables 1-3, a bit value of '1' indicates a negative sign and a bit value of '0' indicates a positive sign. Accordingly, the I component of the signal is negative if the first bit has a value of '1' and positive if the first bit has a value of '0'. Similarly, the Q component of the signal is negative if the first bit has a value of '1' and positive if the first bit has a value of '0'. It is understood that the actual bit representing I and/or Q may vary for different constellations and/or modulation schemes, and that the first and second bits are used for purposes of illustration only. It is also understood that the values may differ for positive and negative signs. For example, in some embodiments, a bit value of '1' may indicate a positive sign and a bit value of '0' may indicate a negative sign.

Figure 7:
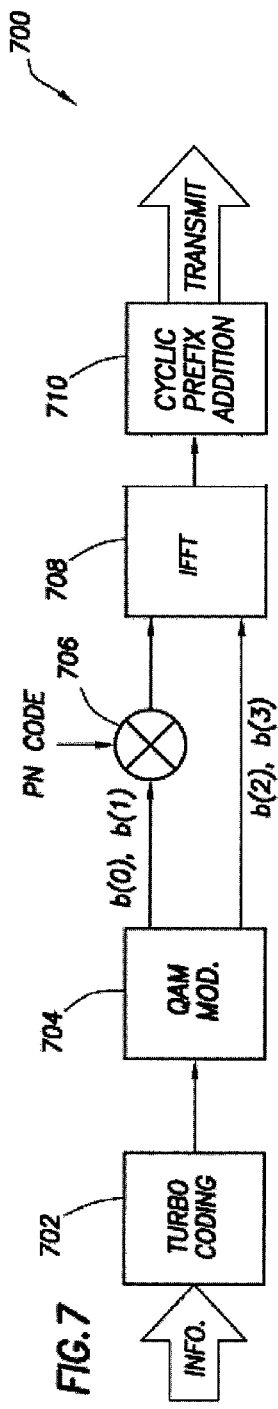
FIG. 7 is a block diagram illustrating an embodiment of a transmission system that scrambles only the sign bits of a bit group.

Referring to FIG. 7, in one embodiment, a block diagram illustrates a transmission system 700 using 16-QAM where only two bits from the block of bits to be QAM-modulated are scrambled by a single scrambling code. Information in the transmission system 700 enters a turbo coding block 702, which produces coded bits that are passed to a QAM modulation block 704. After modulation, PN coding is performed in PN block 706 as follows.

The block of bits b(n), with the indexing starting at n=0, to be transmitted on the physical channel are scrambled after modulation, resulting in a block of scrambled bits c(n) according to the following equations.

$$c(M \cdot n) = b(M \cdot n) \otimes p(n)$$

$$c(M \cdot n + 1) = b(M \cdot n + 1) \otimes p(2 \cdot n + 1)$$

$$c(M \cdot n + 2) = b(M \cdot n + 2)$$

$$\vdots$$

$$c(M \cdot n + M - 1) = b(M \cdot n + M)$$

where M=log 2(K) and K is the modulation order, K=4 for QPSK, K=16 for 16-QAM, and K=64 for 64-QAM. M=2 for QPSK, M=4 for 16-QAM, and M=6 for 64-QAM. n is the group number of bits to be modulated. For a code block of N-bits, n ranges from 0 to (N/M−1). For example, in the case of N=16 bits and 16-QAM modulation (M=4), n=0, 1, 2 and 3 (i.e., there are four groups of 4-bits each).

For M=4 (16-QAM) and n=0, the group of bits c(i) after scrambling is:
c(0)=b(0)⊗p(0)
c(1)=b(1)⊗p(1)
c(2)=b(2)
c(3)=b(3)
where b(i) represents the bits before scrambling. It should be noted that only the first two bits (which are the sign bits) are scrambled by the PN-code. The second and third bits for 16-QAM modulation are not scrambled.

For M=4 and n=1,
c(4)=b(4)⊗p(2)
c(5)=b(5)⊗p(3)
c(6)=b(6)
c(7)=b(7)

For M=4 and n=2,
c(8)=b(8)⊗p(4)
c(9)=b(9)⊗p(5)
c(10)=b(10)
c(11)=b(11)

As described above, only the first two bits (b(0), b(1)) of a bit group (i.e., the two bits that indicate the signs of the real and imaginary parts of the signal) are scrambled by the PN code, while the second and third bits (b(2), b(3)) are not scrambled. The PN coded signals are passed to an IFFT block 708, which outputs time-domain samples. After processing by the IFFT block 708, a cyclic prefix is added to the signal sequence by CP addition block 710. The resulting sequence of samples is referred to as an OFDM symbol and may be transmitted after up-conversion to RF. It is understood that other components, such as an S/P block and a P/S block may be included in the system 700 as previously described, but have been omitted for purposes of clarity.

Figure 8:
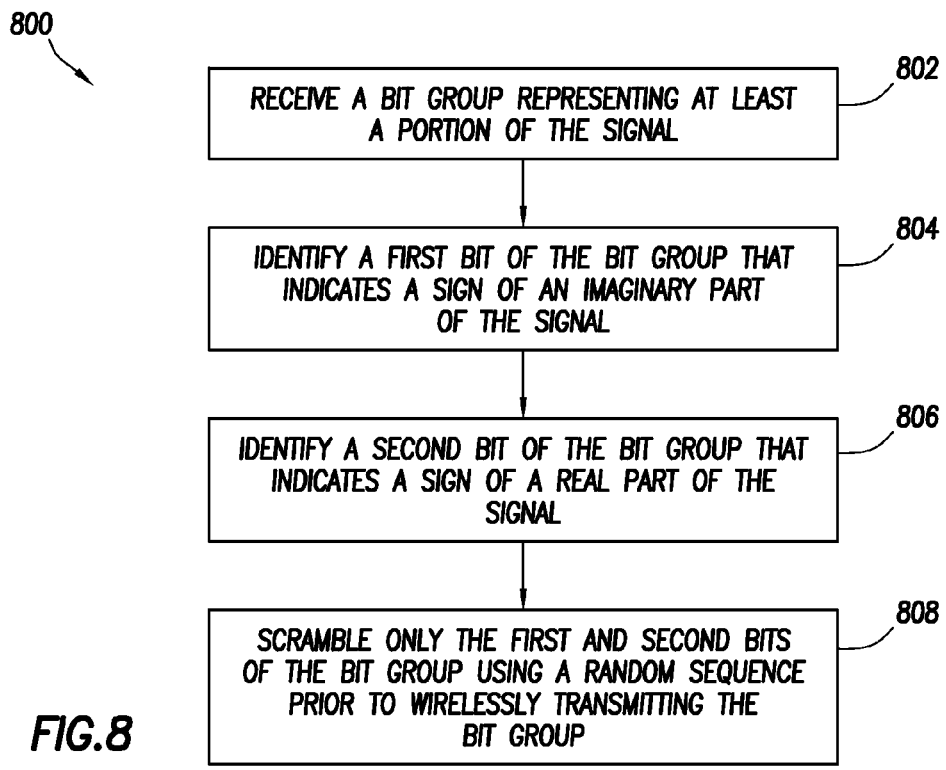
FIG. 8 is a flow chart of one embodiment of a scrambling process that may be used to scramble only the sign bits of a bit group.

Referring to FIG. 8, a method 800 illustrates one embodiment of scrambling that may be used with various transmission systems, such as the system 700 of FIG. 7. In step 802, a group of bits is received that represents at least a portion of a signal. The group of bits may represent the entire signal or may be one of multiple groups of bits that together form the signal. The bit group may vary in length depending on the modulation constellation. In the present example, the signal has a real or quadrature part (Q) and an imaginary part (I).

In step 804, a first bit of the group of bits is identified that indicates a sign of the imaginary part of the signal and, in step 806, a second bit of the group of bits is identified that indicates a sign of the real part of the signal. In step 808, only the first and second bits of the group of bits are scrambled using a random sequence (e.g., one or more PN codes) prior to wirelessly transmitting the group of bits. It is understood that modulation may occur prior to scrambling (as illustrated above in FIG. 7) or after scrambling. Furthermore, it is understood that the sign bits may be positioned anywhere in the group of bits and may not be adjacent to one another.

Figure 9:
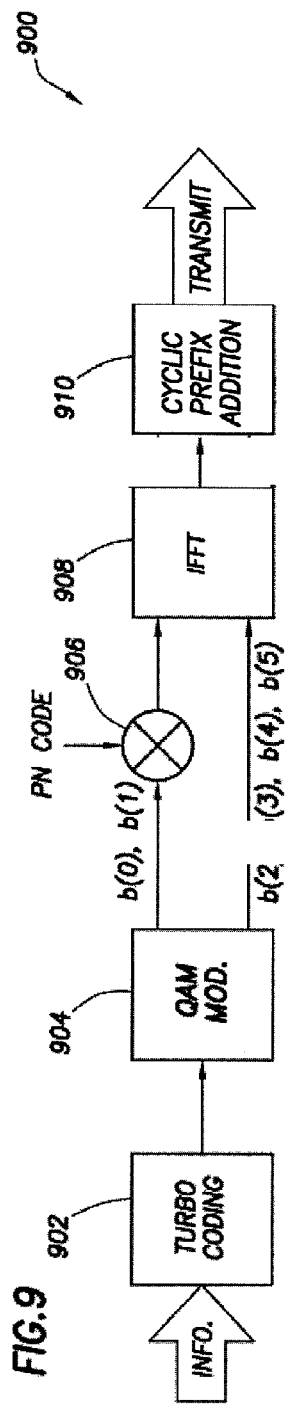
FIG. 9 is a block diagram illustrating another embodiment of a transmission system that scrambles only the sign bits of a bit group.

Referring to FIG. 9, in another embodiment, a block diagram illustrates a transmission system 900 using 64-QAM where only two bits from the block of bits to be QAM-modulated are scrambled by a single scrambling code. In the present example, only the first two bits (b(0), b(1)) (i.e., the two bits that indicate the signs of the real and imaginary parts of the signal) are scrambled by the PN code, while the second, third, fourth and fifth bits (b(2), b(3), b(4), b(5)) are not scrambled. Information in the transmission system 900 enters a turbo coding block 902, which produces coded bits that are passed to a QAM modulation block 904. After modulation, PN coding is performed in PN block 906 as follows.

For M=6 (64-QAM) and n=0, the group of bits, c(i) after scrambling is:
c(0)=b(0)⊗p(0)
c(1)=b(1)⊗p(1)
c(2)=b(2)
c(3)=b(3)
c(4)=b(4)
c(5)=b(5)

For M=6 (64-QAM) and n=1, the group of bits, c(i) after scrambling is:
c(6)=b(6)⊗p(0)
c(7)=b(7)⊗p(1)
c(8)=b(8)
c(9)=b(9)
c(10)=b(10)
c(11)=b(11)

The PN coded signals are passed to an IFFT block 908, which outputs time-domain samples. After processing by the IFFT block 908, a cyclic prefix is added to the signal sequence by CP addition block 910. The resulting sequence of samples may be transmitted after up-conversion to RF. It is understood that other components, such as an S/P block and a P/S block may be included in the system 900 as previously described, but have been omitted for purposes of clarity.

Figure 10:
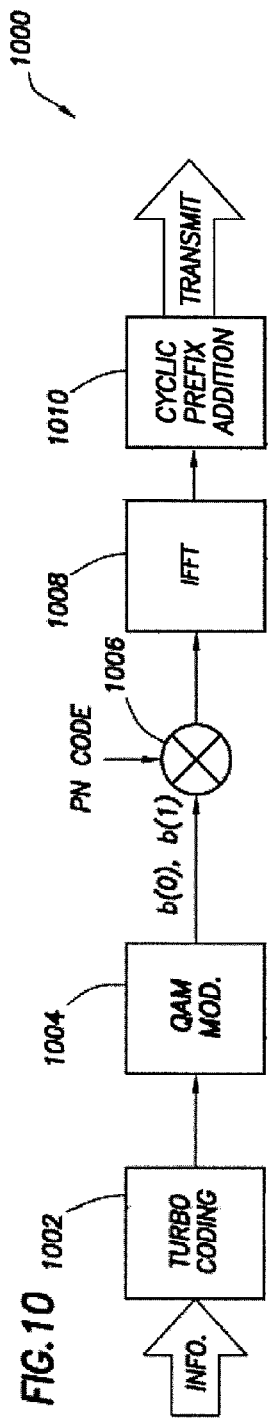
FIG. 10 is a block diagram illustrating yet another embodiment of a transmission system that scrambles only the sign bits of a bit group.

Referring to FIG. 10, in yet another embodiment, a block diagram illustrates a transmission system 1000 using QPSK. It is noted that the bit-group size for QPSK is two, and so all the bits for QPSK are scrambled by the PN-code in the present example. Information in the transmission system 1000 enters a turbo coding block 1002, which produces coded bits that are passed to a QAM modulation block 1004. After modulation, PN coding is performed in PN block 1006 as follows.

For M=2 (QPSK) and n=0, the group of bits, c(i) after scrambling is given as.
c(0)=b(0)⊗p(0)
c(1)=b(1)⊗p(1)

For M=2 (QPSK) and n=1, the group of bits, c(i) after scrambling is given as.
c(2)=b(2)⊗p(0)
c(3)=b(3)⊗p(1)

The PN coded signals are passed to an IFFT block 1008, which outputs time-domain samples. After processing by the IFFT block 1008, a cyclic prefix is added to the signal sequence by CP addition block 1010. The resulting sequence of samples may be transmitted after up-conversion to RF. It is understood that other components, such as an S/P block and a P/S block may be included in the system 1000 as previously described, but have been omitted for purposes of clarity.

Figure 11:
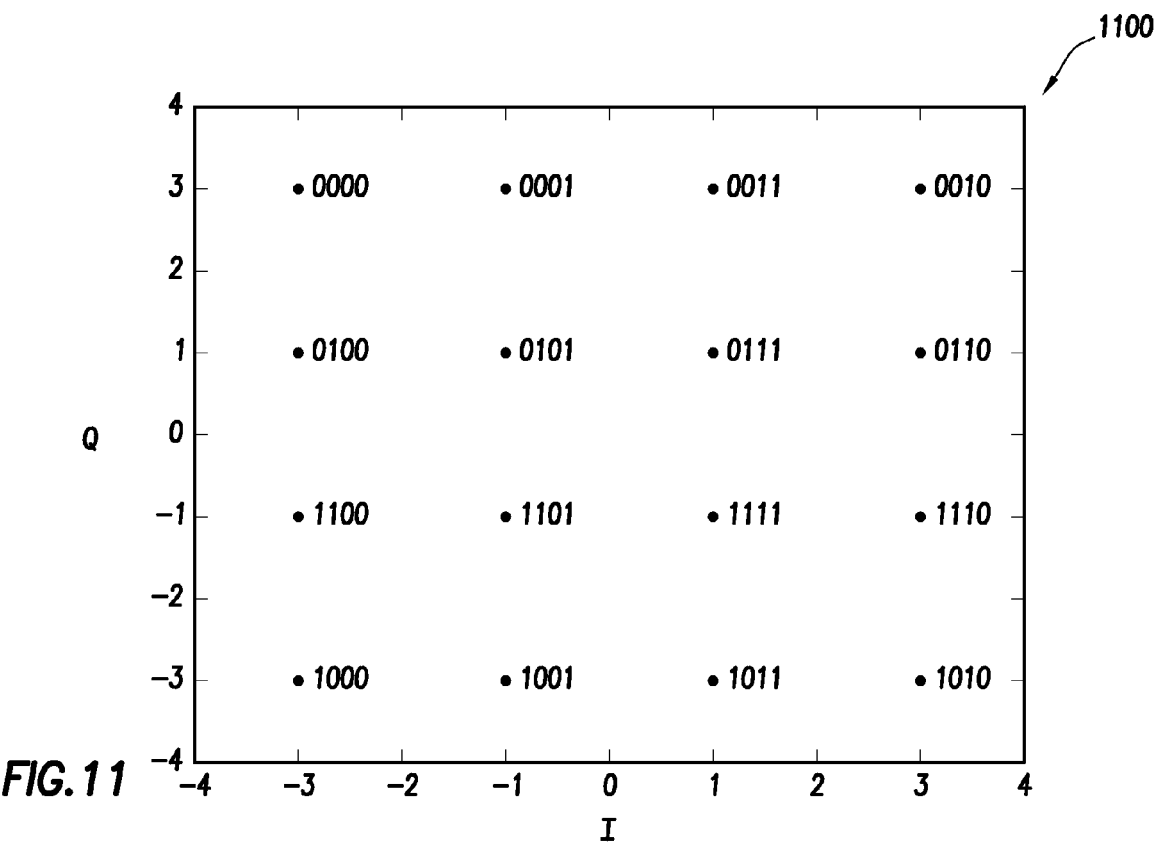
FIG. 11 illustrates a constellation diagram for one embodiment of a Quadrature Amplitude Modulation scheme.
Figure 12:
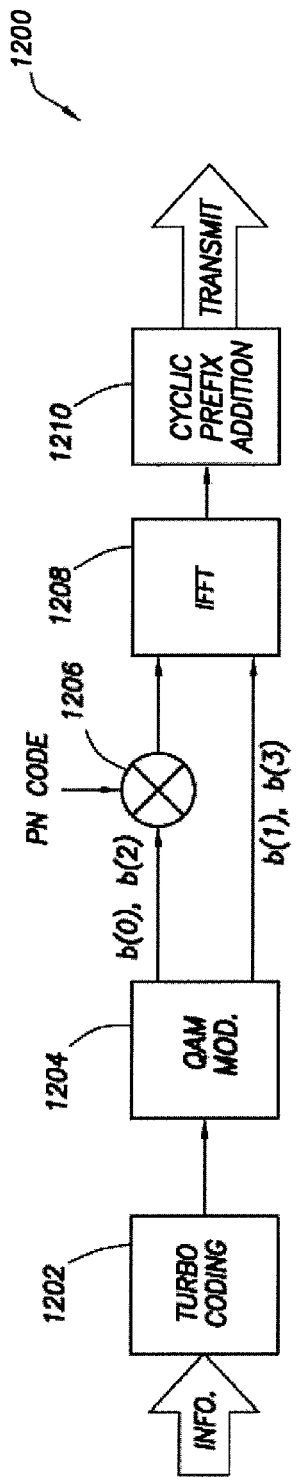
FIG. 12 is a block diagram illustrating another embodiment of a transmission system that scrambles only the sign bits of a bit group.

Referring to FIG. 11 and FIG. 12, in another embodiment, a block diagram (FIG. 12) illustrates a transmission system 1200 using a 16-QAM constellation (FIG. 11). In the constellation illustrated in FIG. 11, the first bit (b(0)) among each group of four bits changes the sign of the Q-part, while the third bit (b(2)) changes the sign of the I-part. Accordingly, in the present example, the first and third bits (b(0), b(2)) from the group of four bits for 16-QAM modulation are scrambled by the PN code while the remaining bits (b(1), b(3)) are not scrambled.

Information in the transmission system 1200 enters a turbo coding block 1202, which produces coded bits that are passed to a QAM modulation block 1204. After modulation, PN coding is performed in PN block 1206 to scramble only the sign bits (e.g., the first and third bits) of each bit group. The PN coded signals are passed to an IFFT block 1208, which outputs time-domain samples. After processing by the IFFT block 1208, a cyclic prefix is added to the signal sequence by CP addition block 1210. The resulting sequence of samples may be transmitted after up-conversion to RF. It is understood that other components, such as an S/P block and a P/S block may be included in the system 1200 as previously described, but have been omitted for purposes of clarity.

Figure 13:
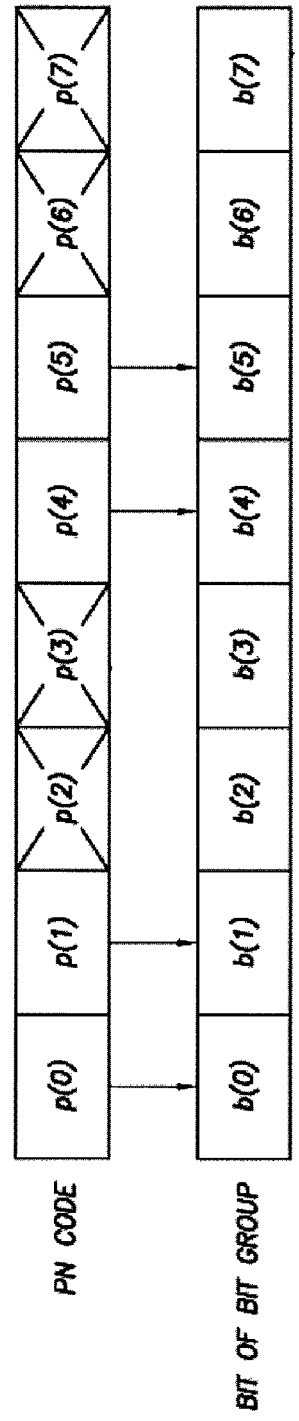
FIG. 13 is a block diagram illustrating one embodiment of how pseudonoise codes corresponding to non-sign bits may be ignored while pseudonoise codes corresponding to sign bits may be used to scramble the sign bits.

Referring to FIG. 13, in yet another embodiment, the number of PN code samples that are generated may be equal to the number of bits in a bit group. However, the PN code samples that align with bits that are not to be scrambled are ignored. The scrambling may be accomplished as follows:

$$c(M \cdot n) = b(M \cdot n) \otimes p(M \cdot n)$$

$$c(M \cdot n + 1) = b(M \cdot n + 1) \otimes p(M \cdot n + 1)$$

$$c(M \cdot n + 2) = b(M \cdot n + 2)$$

$$\vdots$$

$$c(M \cdot n + M - 1) = b(M \cdot n + M)$$

For M=4 and n=0,
c(0)=b(0)⊗p(0)
c(1)=b(1)⊗p(1)
c(2)=b(2)
c(3)=b(3)
For M=4 and n=1,
c(4)=b(4)⊗p(4)
c(5)=b(5)⊗p(5)
c(6)=b(6)
c(7)=b(7)
For M=4 and n=2,
c(8)=b(8)⊗p(8)
c(9) b(9)⊗p(9)
c(10)=b(10)
c(11)=b(11)

Figure 14:
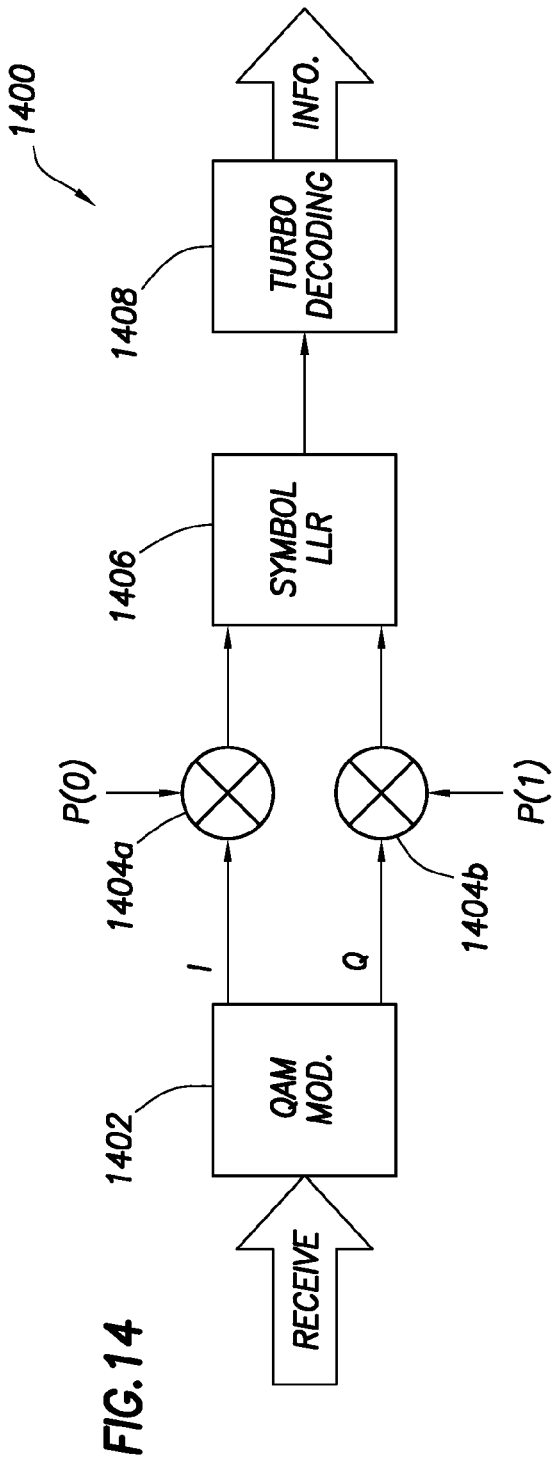
FIG. 14 is a block diagram illustrating an embodiment of a receiving system that descrambles only the sign bits of a bit group.

Referring to FIG. 14, a block diagram illustrates one embodiment of a receiving system 1400 (which may be similar or identical to the receiver 112 of FIG. 1B). In operation, an OFDM symbol is received and demodulated by demodulation block 1402. In the present example, the 16-QAM constellation of Table 2 is used for purposes of illustration. Accordingly, the receiving system 1400 may perform a descrambling operation for the first received 16-QAM symbol of the 16-QAM constellation of Table 2.

As described previously, the first bit of each bit group in this 16-QAM constellation determines the sign of I-part and the second bit determines the sign of the Q-part, and the first two bits of the bit group were scrambled by P(0) and P(1), respectively. In the descrambling operation, the I-part and the Q-part of the first received 16-QAM modulation symbol I+jQ are descrambled by P(0) and P(1), respectively, in descrambling blocks 1404a and 1404b. The bit group may then undergo further processing, such as the generation of log likelihood ratio (LLR) symbol information in LLR symbol block 1406 and turbo coding in turbo coding block 1408.

Figure 15:
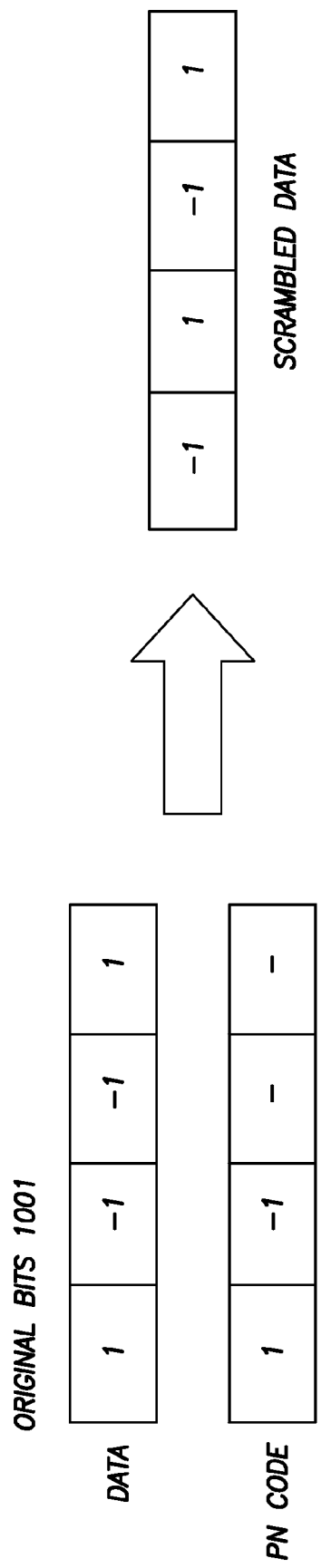
FIG. 15 is a block diagram illustrating one embodiment of how bits may be converted and scrambled.

Referring to FIG. 15, one embodiment of 16-QAM bit scrambling is illustrated. In the present example, the original four bit information sequence '1001' is first converted to a sequence of +1s and −1s with a '1' converted to a +1 and a '0' converted to a −1. This results in a converted sequence of '1 −1 −1 1', which is referred to as DATA in FIG. 15. The first two bits of the four bit 16-QAM sequence (i.e., the sign bits) are then scrambled by a PN code, which is '−1 −1 - - - ' in the present example. The scrambling may be accomplished, for example, by multiplying each bit of the PN code with the corresponding bit of the converted sequence DATA, resulting in the scrambled data sequence '−1 1 −1 1'. Non-scrambled data may be handled in a variety of ways, such as leaving non-scrambled bits alone (e.g., not multiplying them or ignoring the PN codes corresponding to non-scrambled bits as previously described) or filling non-scrambling portions of the PN sequence with 1s. The resulting scrambled data sequence may then be QAM-modulated.

It is understood that, while the present disclosure describes scrambling operations using PN sequences, the principles described herein may also apply to cases where other random sequences, such as random phase shifts other than PN-sequences, are used. It is also understood that the term "random" may not refer to truly random values, but may refer to deterministically determined values that give the appearance of randomness. Accordingly, the present disclosure may be applied to many different scrambling operations where only the sign bits are scrambled. Furthermore, while the present disclosure uses specific examples of pre-modulation and post-modulation scrambling of bits to be transmitted on the physical channel, it is understood that the bits may be scrambled either before or after modulation.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from a flow chart may be combined, performed in an order different from the order shown, or further separated into additional steps. Furthermore, steps may be performed by transmitter and/or receiver elements other than those disclosed. Accordingly, all such modifications are intended to be included within the scope of this disclosure.

What is claimed is:

1. A method comprising:
   receiving a bit group representing at least a portion of a signal, wherein a total number of bits in the bit group is defined by a modulation scheme applied to the signal;
   identifying a first bit of the bit group that indicates a sign of an imaginary part of the signal;
   identifying a second bit of the bit group that indicates a sign of a real part of the signal; and
   scrambling only the first and second bits of the bit group using a random sequence prior to wirelessly transmitting the bit group, wherein scrambling using the random sequence comprises:
   generating a random sequence value for each bit of the bit group; and
   ignoring the random sequence value for each bit of the bit group except the first and second bits.

2. The method of claim 1 further comprising converting the bit group prior to the scrambling, wherein the converting formats the bits in the bit group in preparation for the scrambling.

3. The method of claim 2 wherein the converting changes each '1' bit of the bit group into a '+1' bit and each '0' bit of the bit group into a '−1' bit.

4. The method of claim 1 further comprising modulating the bit group prior to the scrambling.

5. The method of claim 1 further comprising modulating the bit group after performing the scrambling.

6. The method of claim 1 further comprising using a different random sequence for each of the first and second bits.

7. The method of claim 1 wherein the total number of bits in the bit group is two.

8. A method comprising:
   wirelessly receiving a bit group representing at least a portion of a signal;
   identifying a first bit of the bit group that indicates a sign of an imaginary part of the signal;
   identifying a second bit of the bit group that indicates a sign of a real part of the signal; and
   descrambling only the first and second bits of the bit group using a random sequence that corresponds to a random sequence used to scramble only the first and second bits of the bit group prior to transmission, wherein descrambling using the random sequence comprises:
   generating a random sequence value for each bit of the bit group; and
   ignoring the random sequence value for each bit of the bit group except the first and second bits.

9. The method of claim 8 further comprising demodulating the bit group prior to the descrambling.

10. The method of claim 8 further comprising demodulating the bit group after performing the descrambling.

11. The method of claim 8 further comprising:
    using a different random sequence for descrambling each of the first and second bits.

12. A transmission system comprising:
    a modulation block configured to modulate a signal comprising a bit group for transmission;
    a random sequence coding block coupled to the modulation block and configured to scramble only a first bit of the bit group indicating a sign of an imaginary part and a second bit of the bit group indicating a real part of the signal using a random sequence prior to the bit group being wirelessly transmitted without scrambling the remaining bits of the signal, wherein the random sequence comprises a random sequence value generated for each bit of the bit group, and wherein the random sequence coding block is further configured to ignore the random sequence value for each bit of the bit group except the first and second bits; and
    transmission circuitry configured to transmit the modulated and scrambled signal via an antenna.

13. The transmission system of claim 12 wherein the modulation block is positioned relative to the random sequence coding block so that modulation occurs prior to scrambling.

14. The transmission system of claim 12 wherein the modulation block is positioned relative to the random sequence coding block so that modulation occurs after scrambling.

15. The transmission system of claim 12, wherein the random sequence coding block is further configured to use a different random sequence for each of the first and second bits.

16. The transmission system of claim 12 further comprising an error check block configured to add error correction information to the signal prior to transmission.

17. A receiving system comprising:
- receiving circuitry configured to receive a modulated and scrambled signal via an antenna;
- a demodulation block configured to demodulate the signal comprising a bit group; and
- a random sequence decoding block coupled to the demodulation block and configured to descramble only a first bit of the bit group indicating a sign of an imaginary part and a second bit of the bit group indicating a real part of the signal without descrambling the remaining bits of the signal, wherein the first and second bits are scrambled using a random sequence that comprises a random sequence value generated for each bit of the bit group, and wherein the random sequence value for each bit of the bit group except the first and second bits are ignored when the first and second bits are scrambled.

18. The receiving system of claim 17 wherein the demodulation block is positioned relative to the random sequence decoding block so that demodulation occurs prior to descrambling.

19. The receiving system of claim 17 wherein the demodulation block is positioned relative to the random sequence decoding block so that demodulation occurs after descrambling.

20. The receiving system of claim 17, wherein the random sequence decoding block is configured to use a different random sequence for each of the first and second bits.

* * * * *